F. MÜLLER.
METHOD OF MAKING CHAINS.
APPLICATION FILED JUNE 10, 1916.

1,346,507.

Patented July 13, 1920.

Witnesses:

Inventor
Friederich Müller
By his Attorneys
Gifford & Ball

UNITED STATES PATENT OFFICE.

FRIEDERICH MÜLLER, OF HARTFORD, CONNECTICUT, ASSIGNOR TO THE WHITNEY MFG. CO., OF HARTFORD, CONNECTICUT, A CORPORATION OF CONNECTICUT.

METHOD OF MAKING CHAINS.

1,346,507.   Specification of Letters Patent.   Patented July 13, 1920.

Application filed June 10, 1916. Serial No. 102,819.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Chains, of which the following is a specification.

My invention relates to a method of making chains composed of multiple link units connected through bearing studs or pins, each pin forming an integral part of a link structure.

Formerly, the method of making the chain was to stamp out the links from plates or ribbons of steel and to drill or punch two openings in each link near the ends thereof for the reception of the connecting bearing studs or pins, each pin projecting beyond the faces of opposed outer links and being upset or headed at each end to form a rivet, or else being headed at one end only and apertured at the opposite end to receive a spring clip serving to hold the pin from displacement. It is known, however, that a chain thus constructed possesses a number of inherent defects, among which are the following: (1) The apertures of the relatively thin links afford very restricted bearing surfaces for the pins, the apertures soon wearing larger and permitting a distention or distortion of the chain. (2) Due to the tendency of the links to move laterally on the pins, the outer links grind against the rivet heads or spring clips, the small area of the latter permitting their rapid wear and the spreading of the links in opposite directions.

By the present method a chain of the type in question is provided in which a maximum bearing surface for the links is provided, and riveting or spring clips are necessary at only one end of the connecting pins. Furthermore, the pins form an integral part of the link structure, means being provided whereby each pin may be welded upon its link in a countersunk seat formed in the latter with a larger diameter than the pin, means being provided whereby the pin may be automatically centered in said aperture, making it unnecessary to exercise expert supervision in welding, each pin-carrying link supporting the pins with a spacing between them of precisely the degree predetermined for all said links.

In the drawings Figure 1 is a plan view partly in section of a chain embodying the improvements;

Figure 1:
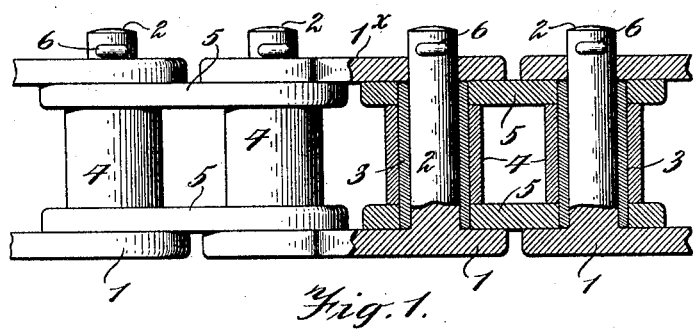

From an inspection of Fig. 1, it will be seen that the chain comprises units each formed of an outer pin-carrying link 1 supporting, as an integral part of its structure, two pins 2, 2, each surrounded by a bushing 3, the latter in turn being surrounded by a friction roller 4 intermediate two connector links 5 fitted upon the bushing 3 and leading to a preceding or succeeding chain unit. A second outer link 1ˣ fitted upon the pins of each outer pin-carrying link is held in place by spring clips 6, thus completing the chain unit.

It will be seen that the construction above described prevents any change in the spacing between the centers of the two pins of a pin-carrying link. Inasmuch as the connector links 5 are somewhat snugly fitted upon the bushings 3, the entire relatively contacting area of the bushings and pins forms the bearing surface for the connector links, and wear is reduced to a minimum.

The manufacture of the integral link and pin structure accurately and with small cost requires the solution of several problems. I have found that cost is reduced when the links and pins are formed separately, because the pins may be cut from rods and the links stamped out of flat stock. But the connection of these parts by contact and a welding operation, requires the use of apparatus capable of accurately spacing the two pins, and, secondly, the use of an apparatus for milling off a "fin" of metal which flows radially from the base of the pin at the welding operation. Also, the welding is not uniform owing to minute pockets of air confined between the base of the pin and the face of the link, and thus inspection and test of the welded structure is required. I have overcome the objections mentioned by providing the link with a socket 7, preferably cylindrical in form, and of a diameter greater than that of the pin, and form said socket with a conical base or bottom 7ª, having the apex located at the center of said socket, I also form the pin with a conical or pointed end $p$, the apex or point of which is located at the center of the pin. By so forming the socket and pin, when the latter is inserted in the socket, a space will be provided surrounding the pin between the latter and the wall of the socket 7, which space not only prevents the formation of air pockets, and consequent faulty welding, but accommodates the flow of metal and renders milling unnecessary.

Figure 2:
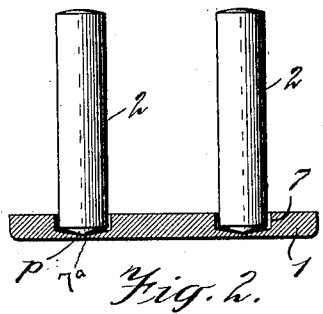
Fig. 2 is a plan view partly in section of a pin-carrying link and its two bearing pins assembled and ready for welding.
Figure 3:
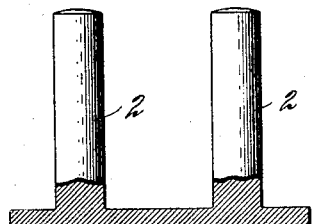
Fig. 3 is a view of the elements shown in Fig. 2 welded together and forming an integral structure.
Figure 4:
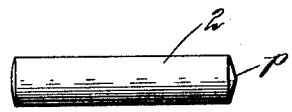
Fig. 4 is a detail view of a bearing pin.
Figure 5:
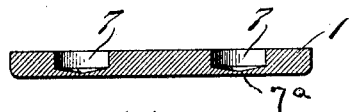
Fig. 5 is a sectional detail view of an outer link.

It will be seen that the coacting conical faces on the pin and the bottom of the socket 7 have an important function when the link and pin are assembled, in that said faces engage and act as cams to cause a relative movement between the pin and the link, insuring that the pin will be accurately and automatically centered in said socket, notwithstanding the fact that the socket is of greater diameter than the pin, and also hold the pin in such centered relation because of the central arrangement of the apexes of the conical end of the pin and the conical bottom of the socket. The said result follows because the pointed end $p$ of each pin will, when inserted in the socket, slide down the inclined bottom face of its socket to the lowermost point thereof—exactly in the center, as shown in Fig. 2. The provision of the socket in the link is an advantage in the welding operation, as the metal between the bottom of the socket and the face of the link is sufficiently thin to permit of the welding operation being performed.

Figure 6:
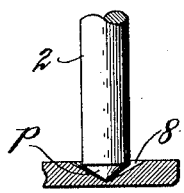
Fig. 6 is a sectional detail view of a bearing stud and link, the latter being provided with a modified form of seat.
Figure 7:
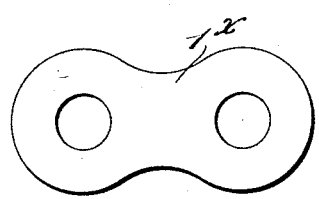
Fig. 7 is an elevation of a link.

The modified socket 8 shown in Fig. 6 is shaped as a cone having walls extending to the face of the link. It is manifest that the socket and end of the pin may be of any desired shapes which possess the characteristics of those herein illustrated and described.

What I claim and desire to secure by Letters Patent of the United States is:—

1. The method of making a link and pin chain unit which consists in forming a link and a pin separate therefrom, and providing the link with a socket having a cam face, and the end of the pin with a cam face adapted to coöperate with the cam face in the socket to center the pin in the socket, and welding the pin in place while centered in the socket.

2. The method of making a link and pin unit, which consists in forming a link and a pin separate therefrom, providing a socket in the link of substantially greater diameter than the pin, automatically positioning the end of the pin within said socket, and welding the pin in place.

3. The method of making a link and pin unit from a link and a pin physically distinct, which consists in forming in the link a socket of substantially greater diameter than that of the pin, so forming the socket and one end of the pin as to bring the end of the pin to a predetermined position within the socket when placed therein, positioning the end of the pin within the socket, and welding the pin to the link.

4. The method of making a link and pin chain unit which consists in making a link and a pin separate therefrom, and forming in the link a socket of larger diameter than the end of the pin so as to form a space between the wall of the socket and the pin, automatically centering the pin in said socket, and welding the link and pin together by a welding operation causing the flow of the metal to fill the space between the pin and the socket wall.

5. The method of forming a link pin unit with the pins having a predetermined space between centers which consists in forming two spaced sockets with inclined seats leading to points spaced apart the desired amount, positioning the pins within the sockets with their centers in alinement with said points and in parallel relation, and welding the pins to the links.

In testimony whereof I have hereunto signed my name in the presence of two subscribing witnesses.

FRIEDERICH MÜLLER.

Witnesses:
 PARKER BOYD,
 S. STUART COOMBS.